(12) United States Patent
Koch et al.

(10) Patent No.: US 10,590,984 B2
(45) Date of Patent: Mar. 17, 2020

(54) TILTING PAD BEARING

(71) Applicant: Zollern BHW Gleitlager GmbH & Co. KG, Braunschweig (DE)

(72) Inventors: Thilo Koch, Duderstadt (DE); Mathias Bertram, Katlenburg-Lindau (DE); Klaus Driftmeier, Salzgitter (DE)

(73) Assignee: ZOLLERN BHW GLEITLAGER GMBH & CO. KG, Braunschweig (DE)

( * ) Notice: Subject to any disclaimer, the term of this patent is extended or adjusted under 35 U.S.C. 154(b) by 0 days.

(21) Appl. No.: 16/089,687

(22) PCT Filed: Mar. 31, 2017

(86) PCT No.: PCT/EP2017/057686
§ 371 (c)(1),
(2) Date: Sep. 28, 2018

(87) PCT Pub. No.: WO2017/167961
PCT Pub. Date: Oct. 5, 2017

(65) Prior Publication Data
US 2019/0085895 A1 Mar. 21, 2019

(30) Foreign Application Priority Data
Apr. 1, 2016 (DE) .................. 10 2016 106 005

(51) Int. Cl.
*F16C 17/03* (2006.01)
*F16C 33/10* (2006.01)

(52) U.S. Cl.
CPC ............ *F16C 17/03* (2013.01); *F16C 33/108* (2013.01)

(58) Field of Classification Search
CPC .......... F16C 17/03; F16C 17/06; F16C 33/108
See application file for complete search history.

(56) References Cited

U.S. PATENT DOCUMENTS 3,542,440 A * 11/1970 Kessler ................... F16C 17/03
384/125
3,610,711 A * 10/1971 Mierley, Sr. ............ F16C 17/03
384/311
(Continued)

FOREIGN PATENT DOCUMENTS

DE 695 03 138 T2 3/1999
DE 102006049516 B3 1/2008
(Continued)

OTHER PUBLICATIONS

Machine Translation of JP S59-93513 (Year: 1984).*

*Primary Examiner* — Alan B Waits
(74) *Attorney, Agent, or Firm* — W&C IP

(57) ABSTRACT

The invention relates to a tilting pad bearing (1) for mounting a shaft, which bearing comprises a housing (10) with an inner side (8) and a housing longitudinal axis (L) and at least one tilting pad (2) with a rear side (6) which faces the inner side (8) of the housing (10), wherein an elevation (22) arranged on the rear side (6) of the at least one tilting pad (2) is arranged in a depression (12), which is arranged in the inner side (8) of the housing (10), in such a way that a first contact face (26) present on the elevation (22) bears against a second contact face (20) on a bottom of the depression (22).

9 Claims, 4 Drawing Sheets

(56) References Cited

U.S. PATENT DOCUMENTS

Figure 1B:
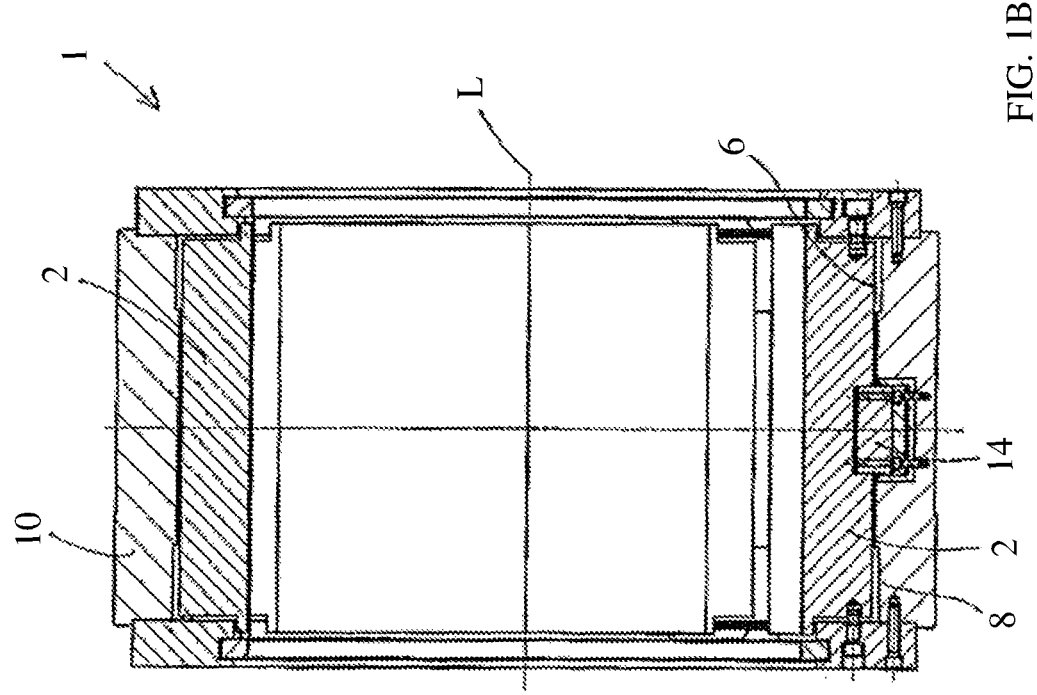

| | | | | |
|---|---|---|---|---|
| 3,891,281 | A * | 6/1975 | Jenness | F16C 13/04 384/307 |
| 3,917,365 | A * | 11/1975 | Jenness | F16C 17/03 384/310 |
| 4,228,571 | A * | 10/1980 | Biondetti | D21G 1/022 492/7 |
| 4,322,116 | A * | 3/1982 | Heinemann | F16C 13/04 384/100 |
| 4,668,108 | A * | 5/1987 | McHugh | F16C 27/00 384/215 |
| 4,714,357 | A * | 12/1987 | Groth | F16C 17/03 384/312 |
| 5,271,676 | A | 12/1993 | Keck et al. | |
| 5,423,613 | A | 6/1995 | Keck et al. | |
| 5,743,657 | A * | 4/1998 | O'Reilly | F16C 17/03 384/312 |
| 5,795,076 | A | 8/1998 | Ball et al. | |
| 5,879,085 | A | 3/1999 | Ball et al. | |
| 9,429,188 | B2 | 8/2016 | Peterson et al. | |
| 2003/0012468 | A1 * | 1/2003 | New | F16C 17/03 384/312 |
| 2006/0193543 | A1 * | 8/2006 | Geiger | F16C 17/03 384/309 |
| 2014/0270607 | A1 | 9/2014 | Livermore-Hardy et al. | |
| 2019/0078465 | A1 * | 3/2019 | Choi | F01D 25/162 |
| 2019/0085829 | A1 * | 3/2019 | Frydendal | F16C 17/03 |
| 2019/0085832 | A1 * | 3/2019 | Brencher | F16C 25/04 |
| 2019/0128272 | A1 | 5/2019 | Oda | F04D 29/046 |
| 2019/0136907 | A1 * | 5/2019 | Gaulier | F16C 17/03 |
| 2019/0226519 | A1 * | 7/2019 | Isayama | F01D 25/22 |

FOREIGN PATENT DOCUMENTS

| | | | |
|---|---|---|---|
| DE | 10 2012 002 713 | A1 | 8/2013 |
| DE | 10 2014 209 062 | A1 | 11/2014 |
| DE | 102015207163 | A1 | 10/2016 |
| JP | 59093513 | A * | 5/1984 ............ F16C 17/03 |
| JP | S63-303 214 | A | 12/1988 |
| WO | 2013106878 | A1 | 7/2013 |
| WO | 2014117195 | A1 | 8/2014 |

* cited by examiner

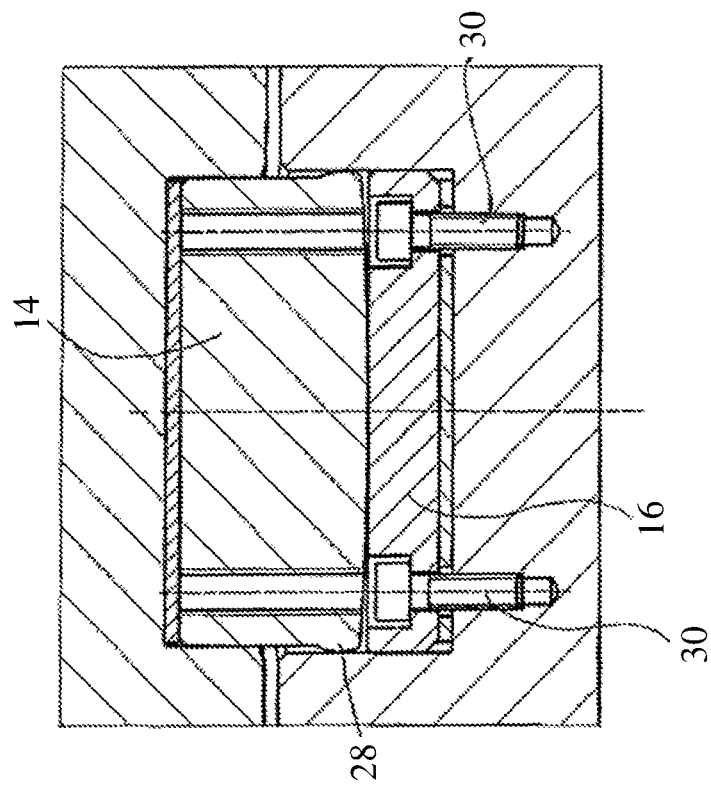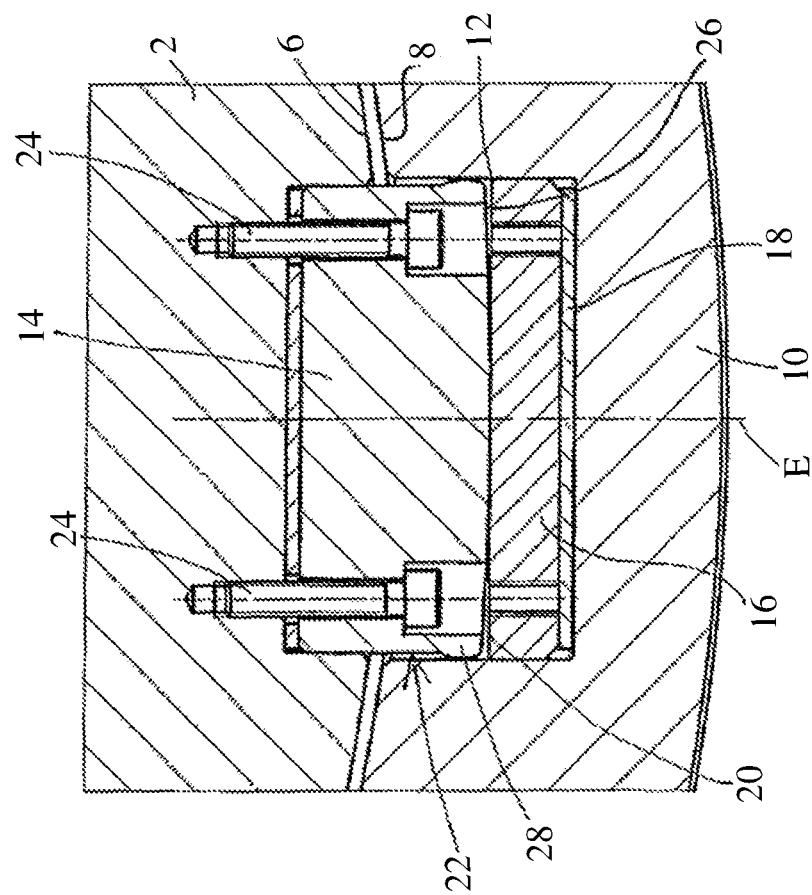

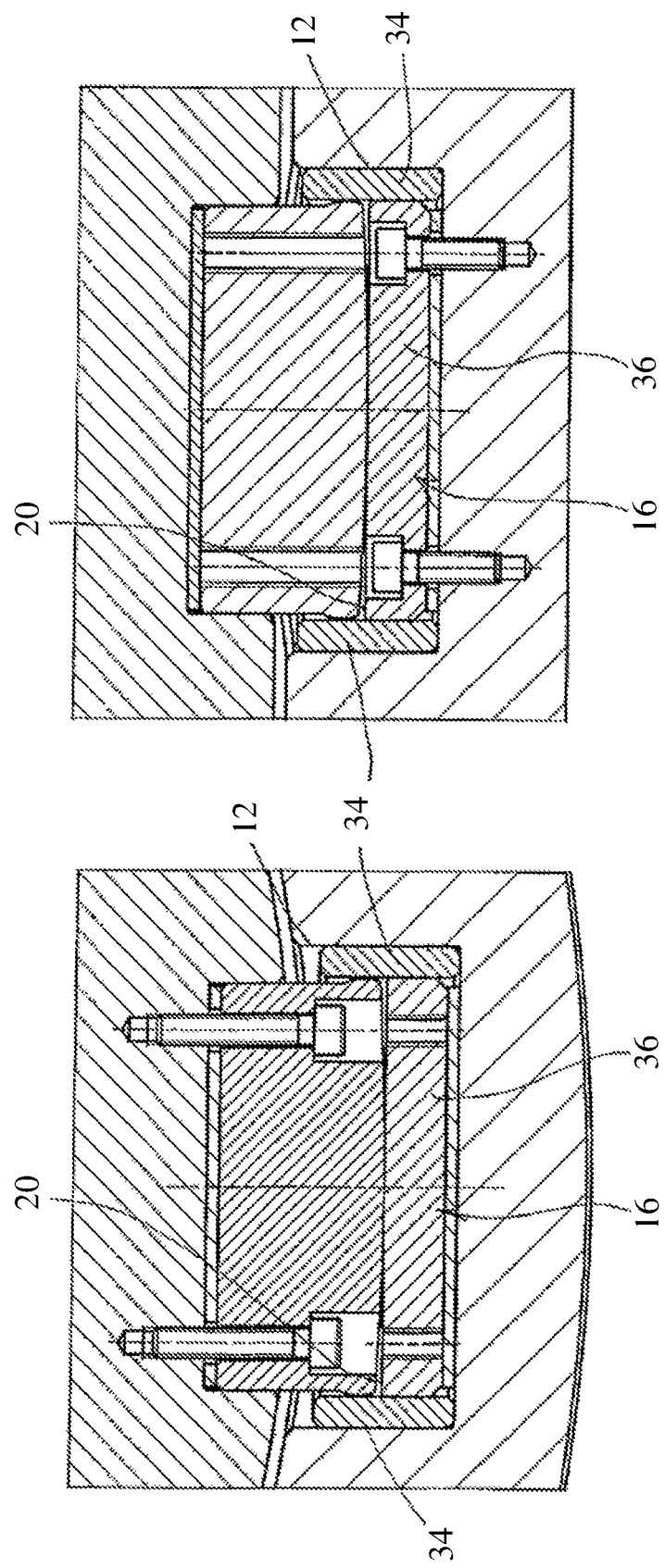

TILTING PAD BEARING

The invention concerns a tilting pad bearing for mounting a shaft, which bearing comprises a housing with an inner side and a housing longitudinal axis and at least one tilting pad with a rear side which faces the inner side of the housing.

Such bearings have been known from the prior art for a long time. They have at least one tilting pad, preferably at least two tilting pads spaced apart from each other in the circumferential direction and each having a bearing face. They are usually lubricated with oil, which forms a lubricant film in the lubricant gap between the bearing face of one of the tilting pads and the shaft to be mounted. Depending on the rotational speed of the shaft to be mounted, the shaft floats on this oil film, leading to a respectively modified tilt situation of the individual tilting pads. Consequently, these lie at different angles on the housing inner wall at different rotational speeds of the shaft to be mounted.

Conventionally, each of the tilting pads has a contact face with which it bears on the inner side of the housing. The inclines and curvatures of the individual contact faces achieve a tilting ability which need not be limited exclusively to one tilt direction. Rotationally symmetrical contact faces are known which for example are curved in the form of a ball segment, so that tilting is possible in almost any direction.

The shaft, which may in some cases be rotating quickly and is mounted in the tilting pad bearing, transmits a torque to the individual tilting pads. It is therefore necessary to provide a slip-prevention or twist-protection device which prevents the individual tilting pads from rotating relative to the housing. Such a twist-protection device may take the form of a peg which protrudes radially inward from the housing inner wall and engages in a recess provided for this purpose in the tilting pad. A disadvantage however is that this leads to greater structural complexity, since firstly the peg must be formed so that it securely prevents slipping and twisting of the tilting pad relative to the housing inner wall, but at the same time it allows a tilting of the tilting pad relative to the housing inner wall in order to achieve an optimum mounting of the shaft to be mounted. A disadvantage however is that the recess in the tilting pad constitutes a material weakening and therefore reduces the component strength.

It is also known from the prior art to provide a depression in the rear side of the tilting pad and an elevation or protrusion on the housing inner wall, which elevation is configured so that it can engage in the depression in the tilting pad. In this way, the two components bear against each other only inside this depression, whereby a twist protection is achieved and the contact faces are formed at the same time. Due to the difference in curvature of the two contact faces, the longitudinal axis of the tilting pad may be oriented according to the longitudinal axis of the shaft. The shaft exerts a torque on the pad in the rotational direction via a lubricant film pressure, creating the second contact face. In the non-tilted position of the pad, this forms a linear contact between the elevation on the housing inner wall and the depression in the tilting pad. A disadvantage is that as the tilt angle of the pad about the shaft axis increases, the contact length between the elevation and the depression, and the size of the contact area, changes. This change may have a disadvantageous effect on the operating behavior of the bearing.

The invention is therefore based on the object of refining a tilting pad bearing such that it is simple and hence cheap to produce, and the maintenance costs and wear are reduced.

The invention achieves this object with a tilting pad bearing according to the preamble of claim 1, which is distinguished in that an elevation provided on the rear side of the at least one tilting pad is arranged in a depression provided in the inner side of the housing, such that a first contact face present on the elevation bears against a second contact face on a base of the depression.

This surprisingly simple construction achieves several advantages. Firstly, the design ensures that no element, neither peg nor elevation which could cause a material weakening in the tilting pad, protrudes radially inward from the housing inner wall. Secondly, the design ensures that the contact region in which the two contact faces bear against each other is shifted radially outward compared with the devices known from the prior art. This, surprisingly, leads to reduced wear.

Preferably, the first contact face and/or the second contact face are curved. Here, the two contact faces have different radii of curvature or convexity, so that tilting relative to each other is possible. Depending on the construction, the first contact face and/or the second contact face may be formed for example as a ball segment or cylinder segment, if tilting in more than one spatial direction or just one spatial direction is desired or technically necessary. Evidently, both the first contact face on the elevation of the tilting pad, and the second contact face on the base of the depression on the inner side of the housing, may be formed with a convex curvature. It is however sufficient if only one of the two contact faces is formed with a convex curvature, so the other may be flat or planar, whereby production is simplified and hence the cost and complexity of production reduced.

Advantageously, the depression has a hollow cylindrical side wall and a circular base. In particular, preferably the depression has a depression longitudinal axis which stands perpendicularly on the housing longitudinal axis and intersects this. The depression is preferably formed so as to be rotationally symmetrical relative to this depression longitudinal axis, so that in particular when at least one contact face is curved in the manner of a ball segment, tilting in all directions is possible.

Advantageously, the elevation is rotationally symmetrical about an elevation longitudinal axis, wherein the elevation longitudinal axis stands perpendicularly on the housing longitudinal axis. In particular, the combination of a rotationally symmetrical depression and a rotationally symmetrical elevation has many advantages.

It has proved particularly advantageous if the elevation has a bead protruding radially outward relative to the elevation longitudinal axis. This bead advantageously has a spherical-annular outer face, wherein particularly advantageously this spherical-annular outer face has a diameter which is slightly smaller, in particular 0.1% to 5% smaller, than the diameter of the circular base of the depression. The difference in diameter may for example be several tenths of a millimeter up to several millimeters. In this way, it can be guaranteed that, within the tilting range provided, i.e. within the angular range about which the tilting pad can tilt relative to the housing, a contact face is always present between the two components without the tilt movement of the tilting pad relative to the housing being restricted in one or more spatial directions. Thus a secure mounting with reduced play or no play is possible without restricting the freedom of movement.

Evidently, it is not necessary for the outwardly protruding bead to have a spherical-annular outer face. In particular, the bead may have a convex curvature with a radius which is significantly smaller than the radius of the elevation. The outer face of the bead in this case would be part of an outer face of a torus and not of a ball. Naturally, irregularly formed outer faces of the bead are also possible.

Particularly advantageously, the depression is at least two millimeters, preferably at least five millimeters, particularly preferably at least ten millimeters deep.

Preferably, the elevation is formed by a contact component which is arranged in a receiver provided for this purpose in the rear side of the tilting pad. In this way, the structural complexity is reduced further and also the production costs lowered. Evidently, it is also possible to arrange a component, on which the second contact face is formed, on the base of the depression. In this way, for example, the depression may be made, e.g. milled, in the inner side of the housing, wherein a relatively large error tolerance is possible. Then a component, which is preferably adjustable in length and width, is inserted in the depression and for example clamped or bolted therein, so that the depression can be brought to the desired dimensions by means of this component which is produced with low error tolerance.

Figure 1A:
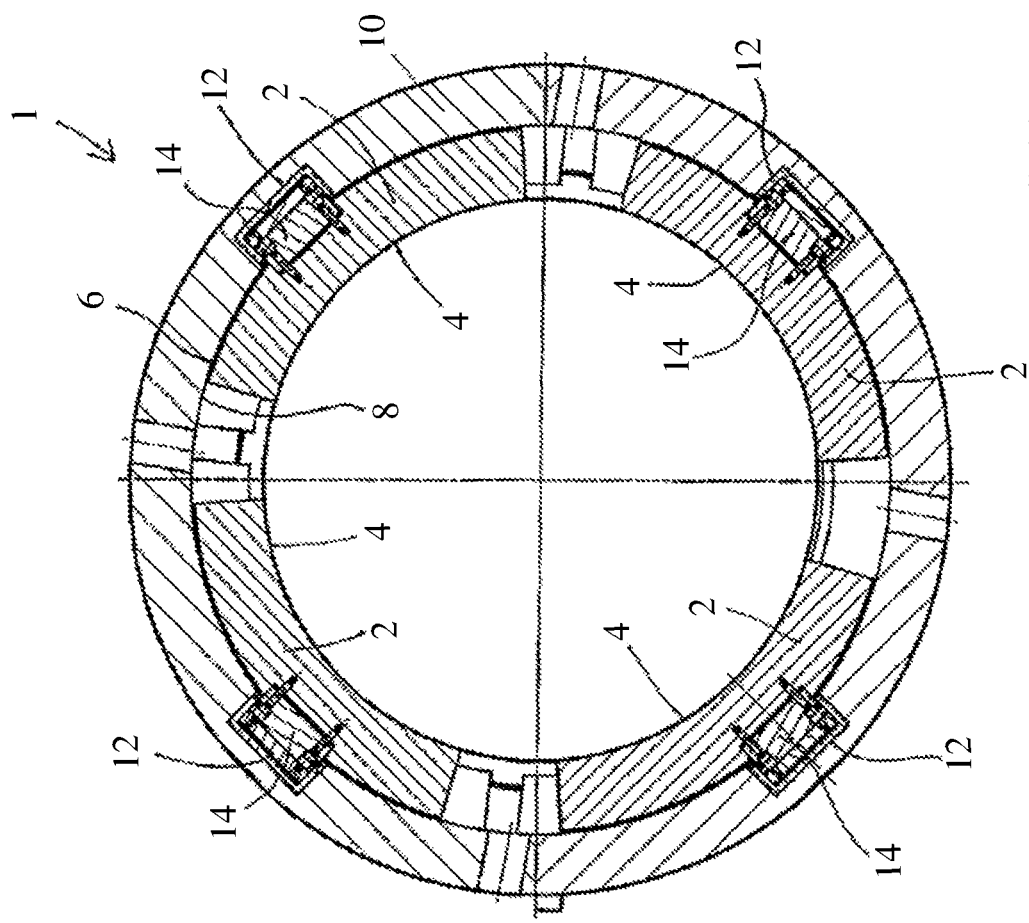
Figures 3A, 3B:
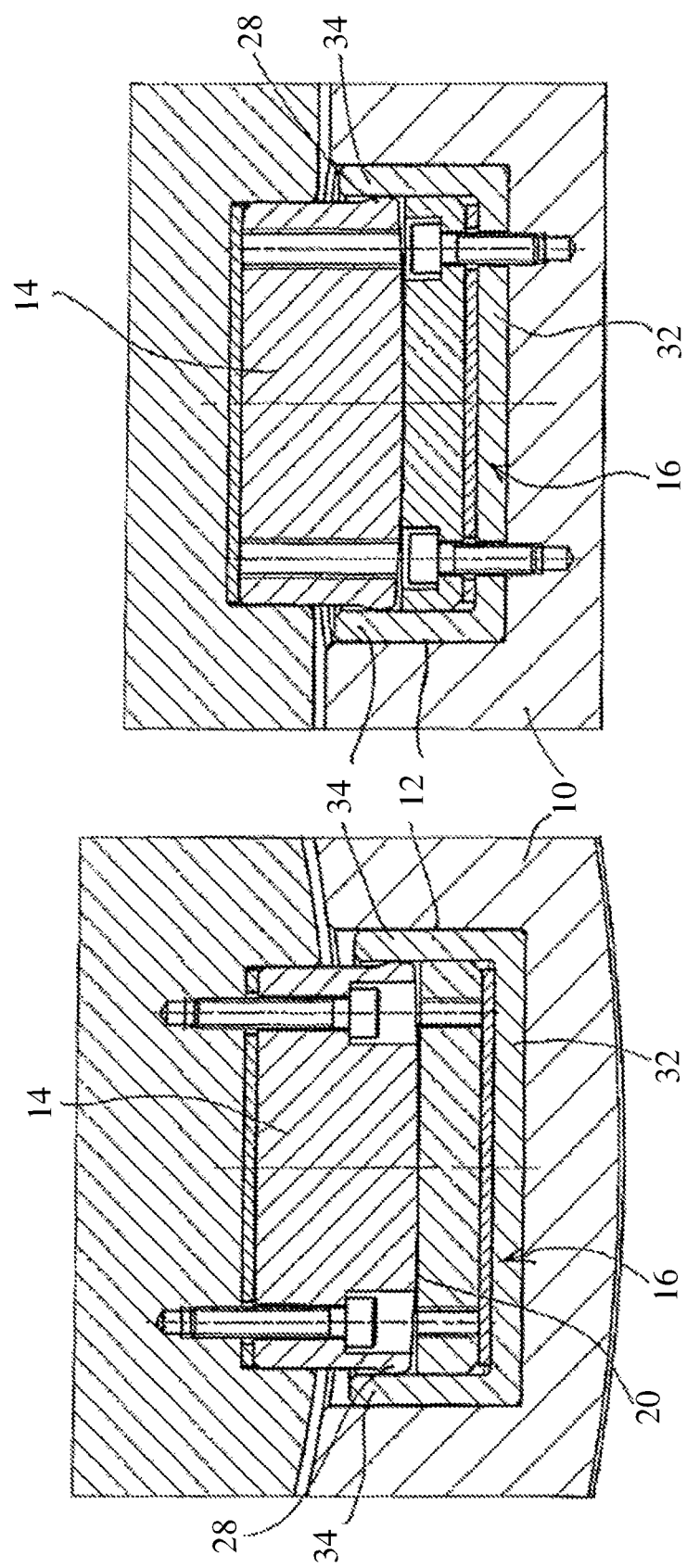

An exemplary embodiment of the present invention is explained in more detail below with reference to the enclosed drawings. The drawings show:

FIGS. 1a and 1b sectional depictions of a tilting pad bearing according to a first exemplary embodiment of the present invention, FIGS. 2a and 2b enlarged extracts according to a first exemplary embodiment of the present invention, FIGS. 3a and 3b enlarged sectional depictions according to a second exemplary embodiment of the present invention, and FIGS. 4a and 4b enlarged depictions according to a third exemplary embodiment of the present invention.

FIG. 1a shows a cross-section through a tilting pad bearing 1 according to a first exemplary embodiment of the present invention. Four tilting pads 2 can be seen, each of which has a bearing face 4. Opposite this bearing face is a rear side 6 which faces an inner wall 8 of a housing 10.

The inner wall 8 of the housing 10 contains four depressions 12, into each of which a contact component 14 protrudes which is arranged on the rear side 6 of the tilting pad 2. These components are shown in more detail in FIGS. 2a to 4b.

FIG. 1b shows a sectional depiction through the tilting pad bearing 1 parallel to the housing longitudinal axis L. The figure depicts two mutually opposite tilting pads 2 and shows the contact component 14 of the lower tilting pad protruding from the rear side 6 which faces the inner wall 8 of the housing 10.

FIGS. 2a and 2b show enlarged extracts of diagrammatic sectional depictions along the section lines shown in FIGS. 1a and 1b. However, the figures show another exemplary embodiment of the present invention. The housing 10 has an inner wall 8 with a depression 12. The latter contains a compensation component 16 which is arranged in the depression 12 via a mounting 18, which for example may be provided as a possibility for damping or compensating for production tolerances or to set a distance. The surface of this compensation component 16, shown at the top in FIG. 2, forms the base of the depression and hence the second contact face 20.

The tilting pad 2 has a rear side 6, from which a contact component 14 protrudes which consequently forms an elevation 22. In the present exemplary embodiment, the contact component 14 is attached to the tilting pad 2 via two fixing screws 24. The lower surface of the contact component 14 shown in FIG. 2a forms the first contact face 26 which, in contrast to the second contact face 20, is formed with a convex curvature in the exemplary embodiment shown in FIGS. 2a and 2b.

In the lower region in FIG. 2a, the contact component 14, i.e. the elevation 22, has an outwardly protruding bead 28 which is advantageously formed as a spherical ring with a radius which gives a slightly smaller diameter than the depression 12. In the exemplary embodiment shown, both the depression 12 and the elevation 22 are rotationally symmetrical about an elevation longitudinal axis E, which at the same time is also a depression longitudinal axis.

FIG. 2b shows the same embodiment in a sectional depiction which corresponds to the section line shown in FIG. 1b. It is evident that the compensation component 16 is also attached to the housing 10 via two screws 30.

FIGS. 3a and 3b show the same sectional depictions as FIGS. 2a and 2b, but for another exemplary embodiment of the present invention. Here again, the depression 12 in the housing 10 contains the compensation component 16 which, in the present exemplary embodiment, is formed from several pieces. It consists of a beaker-like or dish-like positioning element 32, the side wall 34 of which serves as a lateral support for the contact component 14. The contact component 14 has a bead 28 which bears on the side wall 34 of the positioning element 32. A second component with the second contact face 20 is arranged in the positioning element 32.

FIGS. 4a and 4b show the same sectional depictions for a further exemplary embodiment of the present invention. Again, several components are arranged in the depression 12, wherein in this case the compensation component 16 is formed from several pieces and consists of a base element 36 with the second contact face 20, and the peripheral side wall 34 which could also be designated the edge of the beaker-like or dish-like positioning element 32.

LIST OF REFERENCE SIGNS

1 Tilting pad bearing
2 Tilting pad
4 Bearing face
6 Rear side
8 Inner wall
10 Housing
12 Depression
14 Contact component
16 Compensation component
18 Mounting
20 Second contact face
22 Elevation
24 Fixing screw
26 First contact face
28 Bead
30 Screw
32 Positioning element
34 Side wall
36 Base element
L Housing longitudinal axis
E Elevation longitudinal axis

The invention claimed is:

1. A tilting pad bearing for mounting a shaft, comprising a housing with an inner side and a housing longitudinal axis; and
at least one tilting pad with a rear side which faces the inner side of the housing,
wherein an elevation provided on the rear side of the at least one tilting pad is arranged in a depression provided in the inner side of the housing such that a first contact face present on the elevation bears against a second contact face on a base of the depression,
wherein the depression has a hollow cylindrical side wall and a circular base,
wherein the elevation is rotationally symmetrical about an elevation longitudinal axis, wherein the elevation longitudinal axis is perpendicular to the housing longitudinal axis, and
wherein the elevation has a bead protruding radially outward relative to the elevation longitudinal axis.

2. The tilting pad bearing as claimed in claim 1, wherein one or more of the first contact face and the second contact face are curved.

3. The tilting pad bearing as claimed in claim 1, wherein the bead has a circular cross-section.

4. The tilting pad bearing as claimed in claim 3, wherein the bead has a diameter which is smaller than a base diameter of the circular base of the depression.

5. The tilting pad bearing as claimed in claim 4, wherein the diameter of the bead is 0.1% to 5% smaller than the base diameter of the circular base of the depression.

6. The tilting pad bearing as claimed in claim 1, wherein the depression is at least two millimeters deep.

7. The tilting pad bearing as claimed in claim 6, wherein the depression is at least five millimeters deep.

8. The tilting pad bearing as claimed in claim 7, wherein the depression is at least ten millimeters deep.

9. The tilting pad bearing as claimed in claim 1, wherein the elevation is formed by a contact component which is arranged in a receiver provided for this purpose in the rear side of the at least one tilting pad.

* * * * *